US011629415B2

(12) United States Patent
Horn et al.

(10) Patent No.: US 11,629,415 B2
(45) Date of Patent: Apr. 18, 2023

(54) PROCESS FOR PREPARING SODIUM ALKOXIDES

(71) Applicant: Evonik Functional Solutions GmbH, Niederkassel (DE)

(72) Inventors: Michael Horn, Niederkassel (DE); Felix Gärtner, Haltern am See (DE); Philip Heinrich Reinsberg, Bonn (DE); Rüdiger Teufert, Cologne (DE)

(73) Assignee: Evonik Functional Solutions GmbH, Niederkassel (DE)

( * ) Notice: Subject to any disclaimer, the term of this patent is extended or adjusted under 35 U.S.C. 154(b) by 247 days.

(21) Appl. No.: 17/207,862

(22) Filed: Mar. 22, 2021

(65) Prior Publication Data

US 2021/0301407 A1  Sep. 30, 2021

(30) Foreign Application Priority Data

Mar. 24, 2020 (EP) .................................... 20165250

(51) Int. Cl.
*C25B 1/14* (2006.01)
*C25B 9/21* (2021.01)
(Continued)

(52) U.S. Cl.
CPC ............... *C25B 1/14* (2013.01); *C01B 33/32* (2013.01); *C25B 1/26* (2013.01); *C25B 9/21* (2021.01);
(Continued)

(58) Field of Classification Search
CPC ......... C25B 1/14; C25B 1/34–46; C25B 3/07; C25B 3/13; C25B 3/25; C25B 9/19; C25B 9/21; C25B 15/08; C25B 13/04
See application file for complete search history.

(56) References Cited

U.S. PATENT DOCUMENTS

| 5,254,227 A | 10/1993 | Cawlfield et al. |
| 5,389,211 A * | 2/1995 | Sharifian ................. C01B 13/16 |
| | | 205/508 |

(Continued)

FOREIGN PATENT DOCUMENTS

| CN | 108411321 | 8/2018 |
| CN | 111074288 | 4/2020 |

(Continued)

OTHER PUBLICATIONS

European Search Report dated Oct. 5, 2020 in European Application No. 20165250.0, 7 pages.
(Continued)

*Primary Examiner* — Jennifer Wecker
*Assistant Examiner* — Andrew Koltonow
(74) *Attorney, Agent, or Firm* — Grüneberg and Myers PLLC

(57) ABSTRACT

A process for electrochemical preparation of sodium alkoxide is performed in an electrolysis cell having three chambers, wherein the middle chamber is separated from the cathode chamber by a solid-state electrolyte permeable to sodium ions, and from the anode chamber by a diffusion barrier. The geometry of the electrolysis cell protects the solid-state electrolyte permeable to sodium ions from acidic destruction by the pH of the anolyte that falls in the course of electrolysis. The anolyte used in the process is a brine also comprising carbonates and/or hydrogencarbonates, as well as NaCl. The process solves the problem that $CO_2$ from these carbonates and/or hydrogencarbonates forms in the electrolysis cell during the electrolysis of this brine obtained from pretreatment. The process prevents the formation of a gas bubble in the electrolysis cell that disrupts electrolysis and reduces the contamination of the chlorine with $CO_2$.

14 Claims, 3 Drawing Sheets

(51) Int. Cl.
*C25B 15/08* (2006.01)
*C25B 13/04* (2021.01)
*C01B 33/32* (2006.01)
*C25B 1/26* (2006.01)

(52) U.S. Cl.
CPC .............. *C25B 13/04* (2013.01); *C25B 15/08* (2013.01); *C01P 2006/40* (2013.01)

(56) References Cited

U.S. PATENT DOCUMENTS

| | | | |
|---|---|---|---|
| 5,425,856 | A | 6/1995 | Buckholtz et al. |
| 5,575,901 | A | 11/1996 | Hulme et al. |
| 6,217,728 | B1 | 4/2001 | Lehmann et al. |
| 6,221,225 | B1 | 4/2001 | Mani |
| 11,174,559 | B2 * | 11/2021 | Horn ........................ C25B 3/07 |
| 2003/0106805 | A1 | 6/2003 | Horn |
| 2006/0169594 | A1 | 8/2006 | Balagopal et al. |
| 2006/0226022 | A1 | 10/2006 | Balagopal et al. |
| 2007/0138020 | A1 | 6/2007 | Balagopal et al. |
| 2007/0158205 | A1 | 7/2007 | Balagopal et al. |
| 2008/0142373 | A1 | 6/2008 | Joshi et al. |
| 2008/0173540 | A1 * | 7/2008 | Joshi ........................ C25B 3/25 204/242 |
| 2010/0044242 | A1 | 2/2010 | Bhavaraju et al. |
| 2011/0259736 | A1 | 10/2011 | Balagopal et al. |
| 2012/0085657 | A1 | 4/2012 | Bhavaraju |
| 2014/0008239 | A1 | 1/2014 | Bhavaraju |
| 2019/0292668 | A1 | 9/2019 | Fujinuma |
| 2022/0267911 | A1 * | 8/2022 | Reinsberg ................. C25B 9/17 |

FOREIGN PATENT DOCUMENTS

| | | |
|---|---|---|
| DE | 42 33 191 | 7/1993 |
| DE | 103 60 758 | 7/2005 |
| JP | 2016168542 | 9/2016 |
| JP | 2018030045 | 3/2018 |
| WO | 2008/076327 | 6/2008 |
| WO | 2009/059315 | 5/2009 |
| WO | 2009/073062 A2 | 6/2019 |
| WO | 2009/073062 A3 | 6/2019 |

OTHER PUBLICATIONS

U.S. Pat. No. 6,217,728, Apr. 17, 2001, Lehmann et al.
U.S. Appl. No. 10/282,252, filed Oct. 29, 2002, 2003/0106805, Michael Horn.
U.S. Appl. No. 17/204,629, filed Mar. 17, 2021, Michael Horn.

* cited by examiner

PROCESS FOR PREPARING SODIUM ALKOXIDES

CROSS-REFERENCE TO RELATED APPLICATIONS

This application claims priority to European Patent Application No. 20165250.0, filed Mar. 24, 2020, which is incorporated herein by reference.

BACKGROUND OF THE INVENTION

Field of the Invention

The present invention relates to a process for electrochemical preparation of sodium alkoxide. The process is performed in an electrolysis cell having three chambers, wherein the middle chamber is separated from the cathode chamber by a solid-state electrolyte permeable to sodium ions, for example NaSICON, and from the anode chamber by a diffusion barrier, for example a membrane selective for cations or anions. The geometry of the electrolysis cell protects the solid-state electrolyte permeable to sodium ions from acidic destruction by the pH of the anolyte that falls in the course of electrolysis. The anolyte used in the process is a brine also comprising carbonates and/or hydrogencarbonates as well as NaCl. Such brines are typically formed in the pretreatment of raw brines that are obtained from sea salt, for example. In this pretreatment, metal ions other than sodium, for example $Sr^2$, $Ba^{2+}$, $Ca^{2+}$, $Mg^{2+}$, are removed from the raw brine by means of carbonate precipitation, and hence a brine comprising NaCl and carbonate and/or hydrogencarbonate is obtained. The process according to the invention solves the problem that $CO_2$ from these carbonates and/or hydrogencarbonates forms in the electrolysis cell during the electrolysis of these brines obtained from the pretreatment. It prevents the formation of a gas bubble in the electrolysis cell that disrupts electrolysis and reduces the contamination of the chlorine, which is especially obtained in the process according to the invention, with $CO_2$.

Description of Related Art

The electrochemical preparation of alkali metal alkoxide solutions is an important industrial process which is described, for example, in DE 103 60 758 A1. US 200610226022 A1 and WO 2005/059205 A1. The principle of these processes is an electrolysis cell in which the solution of an alkali metal salt, for example sodium chloride or NaOH, is present in the anode chamber, and the alcohol in question or an alcoholic solution with a low concentration of the alkali metal alkoxide in question, for example sodium methoxide or sodium ethoxide, is present in the cathode chamber. The cathode chamber and the anode chamber are separated by a ceramic that conducts the alkali metal ion used, for example NaSICON or analogues thereof for potassium or lithium. On application of a current, chlorine forms at the anode—when a chloride salt of the alkali metal is used—and hydrogen and alkoxide ions at the cathode. The result of the balancing of charge is that alkali metal ions migrate from the middle chamber into the cathode chamber via the ceramic that is selective therefor. The balancing of charge between middle chamber and anode chamber results from the migration of cations when cation exchange membranes are used or the migration of anions when anion exchange membranes are used, or from migration of both ion types when non-specific diffusion barriers are used. This increases the concentration of the alkali metal alkoxide in the cathode chamber, and the concentration of the sodium ions in the anolyte is lowered.

NaSICON solid-state electrolytes are also used in the electrochemical preparation of other compounds:

WO 2014/008410 A1 describes an electrolytic process for preparing elemental titanium or rare earths. The basis of this process is that titanium chloride is formed from $TiO_2$ and the corresponding acid, and this is reacted with sodium alkoxide to give titanium alkoxide and NaCl and finally converted electrolytically to elemental titanium and sodium alkoxide.

WO 2007/082092 A2 and WO 2009/059315 A1 describe processes for producing biodiesel, in which, with the aid of alkoxides prepared electrolytically by means of NaSICON, triglycerides are first converted to the corresponding alkali metal triglycerides and are reacted in a second step with electrolytically generated protons to give glycerol and the respective alkali metal hydroxide.

The prior art accordingly describes processes that are performed in electrolysis cells with an ion-permeable layer, for example NaSICON solid-state electrolytes. However, these solid-state electrolytes typically have the disadvantage that they lack long-term stability toward aqueous acids. This is problematic in that, during the electrolysis in the anode chamber, the pH falls as a result of oxidation processes (for example in the case of preparation of halogens by disproportionation or by oxygen formation). These acidic conditions attack the NaSICON solid-state electrolyte to such a degree that the process cannot be used on the industrial scale. In order to counter this problem, various approaches have been described in the prior art.

For instance, three-chamber cells have been proposed in the prior art. These are known in the field of electrodialysis, for example U.S. Pat. No. 6,221,225 B1.

WO 2012/048032 A2 and US 2010/0044242 A1 describe, for example, electrochemical processes for preparing sodium hypochlorite and similar chlorine compounds in such a three-chamber cell. The cathode chamber and the middle chamber of the cell are separated here by a solid-state electrolyte permeable to cations, for example NaSICON. In order to protect this from the acidic anolyte, the middle chamber is supplied, for example, with solution from the cathode chamber. US 2010/0044242 A1 also describes, in FIG. 6, the possibility of mixing solution from the middle chamber with solution from the anode chamber outside the chamber in order to obtain sodium hypochlorite.

Such cells have also been proposed in the prior art for the preparation or purification of alkali metal alkoxides. For instance, U.S. Pat. No. 5,389,211 A describes a process for purifying alkoxide solutions in which a three-chamber cell is used, in which the chambers are delimited from one another by cation-selective solid-state electrolytes or else nonionic dividing walls. The middle chamber is used as buffer chamber in order to prevent the purified alkoxide or hydroxide solution from the cathode chamber from mixing with the contaminated solution from the anode chamber.

WO 2008/076327 A1 describes a process for preparing alkali metal alkoxides. This uses a three-chamber cell, the middle chamber of which has been filled with alkali metal alkoxide (see, for example, paragraphs 100081 and 100671 of WO 2008/076327 A1). This protects the solid-state electrolyte separating the middle chamber and the cathode chamber from the solution present in the anode chamber, which becomes more acidic in the course of electrolysis. However, this arrangement has the disadvantage that the alkali metal alkoxide solution is the desired product, but this is consumed and continuously contaminated as buffer solution. A further disadvantage of the process described in WO 2008/076327 A1 is that the formation of the alkoxide in the cathode chamber depends on the diffusion rate of the alkali metal ions through two membranes or solid-state electrolytes. This in turn leads to slowing of the formation of the alkoxide.

The present invention addresses a further problem. This is that it is necessary in the industrial electrolysis of NaCl to free the salt of secondary constituents that it contains on account of its origin as deposited sea salt before it is subjected to the electrolysis, These include the removal of insoluble constituents and the precipitation and removal of ions such as sulfate, $Sr^2$, $Ba^{2+}$, $Ca^{2+}$ and $Mg^{2+}$. Although these impurities do not have a direct effect on the electrolysis process in the three-chamber cell, the non-elimination thereof leads to a rise in their concentration in the salt solution. The reason for this rise lies in the customary construction for electrolyses and the feeding of salt into the electrolysis cell. During the electrolysis, there is typically electrochemical conversion of just a portion of the salt dissolved in water. Before the concentration of the salt drops to a value that would lead to a distinct decrease in conductivity, the solution is continuously renewed. The residual solution here generally still contains more than ⅔ of the original concentration of salt. In order to make the electrolysis process more economically viable and to prevent large amounts of salt waste from occurring, the brine, after passing through the electrolysis, is admixed with fresh salt, such that the content in the raw brine obtained thereafter again corresponds to the concentration that the brine initially had at the start of the electrolysis in the cell.

This procedure is similar to a closed liquid circuit which is constantly replenished with salt. The amount of salt replenished corresponds here in stoichiometric terms to the amount of alkoxide that forms in the electrolysis.

Constituents that are present in the salt but are not converted in the electrolysis become concentrated over time with this technology. This does not impair the conversion in the electrolysis cell immediately, but does so after a certain time. For example, side effects such as the deposition of calcium sulfate in pipelines, which commence at concentrations in the region of 10 ppm in brines, can lead to problems in the brine supply, to deposits on the solid-state electrolyte surface or to blockage of the ion-permeable diffusion barrier, and stop the electrolysis process completely or at least affect it in an energetically unfavourable manner. In addition, this can also lead to reactions at the anode that destroy it.

Specifically when, as is advantageous, the salt used in the electrolysis comes from sea salt, it is therefore essential to remove secondary constituents from the raw brine before it is supplied to the electrolysis cell for there not to be enrichment of unwanted salts and, in particular, for certain specific limits for the secondary constituents not to be exceeded.

As is common knowledge from the operation of chloralkali electrolyses, this depletion proceeds mainly via precipitation reactions resulting from addition of carbonate-containing precipitation chemicals or establishment of particular alkaline pH values at which there is carbonate and hydroxide precipitation, for example according to the corresponding reaction equations (1) to (3):

$$FeCl_3 + 3\, NaOH \rightarrow Fe(OH)_3 + 3\, NaCl \quad (1)$$

$$CaCl_2 + Na_2CO_3 \rightarrow CaCO_3 + 2\, NaCl \quad (2)$$

$$MgCl_2 + 2\, NaOH \rightarrow Mg(OH)_2 + 2\, NaCl \quad (3)$$

The addition of NaOH is achieved via establishment of a particular pH in the range from 10 to 11 in the brine. Carbonate is generally added with a distinct excess of sodium carbonate (soda). The precipitated carbonates and hydroxides are removed from the brine via a filtration. Performance of this purification step affords a brine having alkaline pH and a detectable content of carbonates or hydrogencarbonates.

But the presence of carbonates and hydrogencarbonates in the brine in the electrolysis cell leads to a further problem. During the electrolysis in the three-chamber cell, the pH of the brine is altered in the middle chamber and in the anolyte chamber. The pH falls; the brine becomes more acidic. This effect is attributable to the fact that chlorine formed at the anode disproportionates directly in the salt solution according to reaction equation (4):

$$Cl_2 + H_2O \rightarrow HOCl + HCl. \quad (4)$$

This forms hydrochloric acid and hypochlorous acid. This leads in turn to lowering of the pH of the anolyte brine down to a pH of 3 or lower in the anolyte chamber. This also lowers the pH in the middle chamber. This is certainly the case when, in a three-chamber cell, the middle chamber and anolyte chamber are separated only by the ion-permeable diffusion barrier through which protons are transported from the anolyte chamber into the middle chamber.

The reduction in the pH results in release of the carbonates and hydrogencarbonates present in the anolyte as $CO_2$. In the anolyte chamber, this is transported out of the chamber with the chlorine formed. The $CO_2$ can be separated from the chlorine in downstream industrial steps. The steps are common knowledge and industrially tried and tested. Examples of available methods include chlorine scrubbing or chlorine liquefaction. In many applications, a small proportion of $CO_2$ does not disrupt the further use of chlorine in any case. Nevertheless, the contamination of $Cl_2$ with $CO_2$ is a fundamental problem, for example, in the treatment of drinking water with chlorine (F. Küke, Vom Wasser 2005, 103, 18-22) and is therefore undesirable. In addition, $CO_2$ impurities in chlorine can lead to unwanted reactions, for example a conversion to acid chlorides.

In the case of three-chamber cells, the release of $CO_2$ is detected on account of the reduction in pH in the middle chamber as well, where it likewise leads to problems. The pH is reduced here in the course of electrolysis typically only to values of 8 to 9, i.e. not as significantly as in the anode chamber. However, this is sufficient to cause the outgassing of $CO_2$.

By virtue of the fact that the brine is supplied to the electrolysis cell via the middle chamber and thence transferred directly into the anode chamber, $CO_2$ also accumulates in the middle chamber. While $CO_2$ can be removed from the electrolysis cell with the anolyte in the anode chamber, it cannot escape from the middle chamber. The effect of this is that, after a certain time, the middle chamber is filled with gas to a considerable degree. This reduces the brine-covered surface area of the solid-state electrolyte available for the electrochemical conversion, which increases the resistance of the overall electrolysis. This in turn leads to a reduction in conversion proportional to a reduction in the current between anode and cathode at constant voltage, or to higher energy costs if the resultant reduction in the amount of current is to be compensated for by an increase in the voltage between anode and cathode.

It was therefore an object of the present invention to provide an improved process for electrolytic preparation of sodium alkoxide and especially chlorine, which ensures protection of the cation-conducting solid-state electrolyte from acid and does not have the aforementioned disadvantages. More particularly, the process is to feature more sparing use of the reactants compared to the prior art. In addition, the process is to enable the use of NaCl solution that also includes carbonates and hydrogencarbonates, and the contamination of the chlorine with $CO_2$ and the accumulation of $CO_2$ in the electrolysis cell are to be reduced.

A process which achieves the object of the invention has now surprisingly been found.

SUMMARY OF THE INVENTION

The process according to the invention is one for preparing a solution $L_1$ <115> of a sodium alkoxide NaOR in the alcohol ROH, especially of chlorine ($Cl_2$) and a solution $L_1$ <115>, in an electrolysis cell E <100>, wherein E <100> comprises at least one anode chamber $K_A$ <101>, at least one cathode chamber $K_K$ <102> and at least one interposed middle chamber $K_M$ <103>, wherein $K_A$ <101> comprises an anodic electrode $E_A$ <104> and an outlet $A_{KA}$ <106>, wherein $K_K$ <102> comprises a cathodic electrode $E_K$ <105>, an inlet $Z_{KK}$ <107> and an outlet $A_{KK}$ <109>, wherein $K_M$ <103> comprises an inlet $Z_{KM}$ <108> and a gas outlet G <120>, is separated from $K_A$ <101> by a diffusion barrier D <110> and is separated from $K_K$ <102> by a sodium cation-conducting solid-state electrolyte $F_K$ <111>, wherein $K_A$ <101> and $K_M$ <103> are connected to one another by a connection $V_{AM}$ <112> through which liquid can be routed from $K_M$ <103> into $K_A$ <101>, wherein the process comprises the following steps (a), (b) and (c) that proceed simultaneously:

(a) a solution $L_2$ <113> comprising the alcohol ROH and preferably comprising at least one sodium alkoxide NaOR is routed through $K_K$ <102>, (b) a neutral or alkaline, aqueous solution $L_3$ <114> comprising NaCl and at least one salt S selected from hydrogencarbonate and carbonate is routed through $K_M$ <103>, then via $V_{AM}$ <112>, then through $K_A$ <101>, (c) voltage is applied between $E_A$ <104> and $E_K$ <105>, which affords the solution $L_1$ <115> at the outlet $A_{KK}$ <109>, wherein the concentration of NaOR in $L_1$ <115> is higher than in $L_2$ <113>, and which affords an aqueous solution $L_4$ <116> of NaCl and especially $Cl_2$ at the outlet $A_{KA}$ <106>, wherein the concentration of NaCl in $L_4$ <116> is lower than in $L_3$ <114>, and wherein the total concentration of all salts S in $L_4$ <116> is lower than in $L_3$ <114>, and which forms $CO_2$ <121> in the middle chamber $K_M$ <103>, which is removed from the middle chamber $K_M$ <103> via the gas outlet G <120>, wherein R is an alkyl radical having 1 to 4 carbon atoms.

The invention also includes the following embodiments:

1. Process for preparing a solution $L_1$ <115> of a sodium alkoxide NaOR in the alcohol ROH in an electrolysis cell E <100>, wherein E <100> comprises at least one anode chamber $K_A$ <101>, at least one cathode chamber $K_K$ <102> and at least one interposed middle chamber $K_M$ <103>, wherein $K_A$ <101> comprises an anodic electrode $E_A$ <104> and an outlet $A_{KA}$ <106>, wherein $K_K$ <102> comprises a cathodic electrode $E_K$ <105>, an inlet $Z_{KK}$ <107> and an outlet $A_{KK}$ <109>, wherein $K_M$ <103> comprises an inlet $Z_{KM}$ <108> and a gas outlet G <120>, is separated from $K_A$ <101> by a diffusion barrier D <110> and is separated from $K_K$ <102> by a sodium cation-conducting solid-state electrolyte $F_K$ <111>, wherein $K_A$ <101> and $K_M$ <103> are connected to one another by a connection $V_{AM}$ <112> through which liquid can be routed from $K_M$ <103> into $K_A$ <101>, wherein the process comprises the following steps (a), (b) and (c) that proceed simultaneously:

(a) a solution $L_2$ <113> comprising the alcohol ROH and preferably additionally comprising at least one sodium alkoxide NaOR is routed through $K_K$ <102>, (b) a neutral or alkaline, aqueous solution $L_3$ <114> comprising NaCl and at least one salt S selected from hydrogencarbonate and carbonate is routed through $K_M$ <103>, then via $V_{AM}$ <112>, then through $K_A$ <101>, (c) voltage is applied between $E_A$ <104> and $E_K$ <105>, which affords the solution $L_1$ <115> at the outlet $A_{KK}$ <109>, wherein the concentration of NaOR in $L_1$ <115> is higher than in $L_2$ <113>, and which affords an aqueous solution $L_4$ <116> of NaCl at the outlet $A_{KA}$ <106>, wherein the concentration of NaCl in $L_4$ <116> is lower than in $L_3$ <114>, and wherein the total concentration of all salts S in $L_4$ <116> is lower than in $L_3$ <114>, and which forms $CO_2$ <121> in the middle chamber $K_M$ <103>, which is removed from the middle chamber $K_M$ <103> via the gas outlet G <120>, wherein R is an alkyl radical having 1 to 4 carbon atoms.

2. Process according to Embodiment 1, wherein R is selected from the group consisting of methyl and ethyl.

3. Process according to Embodiment 1 or 2, wherein the diffusion barrier D <110> is selected from the group consisting of cation-conducting and anion-conducting membranes.

4. Process according to Embodiment 3, wherein the diffusion barrier D <110> is a sodium cation-conducting membrane.

5. Process according to any of Embodiments 1 to 4, wherein the flow direction of $L_3$ <114> in the middle chamber $K_M$ <103> is the opposite of the flow direction of $L_3$ <114> in the anode chamber $K_A$ <101>.

6. Process according to any of Embodiments 1 to 5, wherein the connection $V_{AM}$ <112> is formed within and/or outside the electrolysis cell E <100>.

7. Process according to any of Embodiments 1 to 6, wherein the connection $V_{AM}$ <112> between middle chamber $K_M$ <103> and anode chamber $K_A$ <101> is arranged in such a way that at least a portion of the aqueous solution $L_3$ <114> flows completely through the middle chamber $K_M$ <103> and the anode chamber $K_A$ <101>.

8. Process according to any of Embodiments 1 to 7, wherein the sodium cation-conducting solid-state electrolyte $F_K$ <111> has a structure of the formula $M^I_{1+2w+x-y+z}M^{II}_w$-$M^{III}_x Zr^{IV}_{2-w-x-y}M^V_y(SiO_4)_z(PO_4)_{3-z}$, where $M^I$ is selected from Na$^+$ and Li$^+$, $M^{II}$ is a divalent metal cation, $M^{III}$ is a trivalent metal cation.

$M^V$ is a pentavalent metal cation, the Roman indices I, II, III, IV, V indicate the oxidation numbers in which the respective metal cations exist, and w, x, y, z are real numbers, where $0 \le x < 2$, $0 \le y < 2$, $0 \le w < 2$, $0 \le z < 3$, and where w, x, y, z are chosen such that $1+2w+x-y+z \ge 0$ and $2-w-x-y \ge 0$.

9. Process according to Embodiments 1 to 8, wherein $L_2$ <113> comprises the alcohol ROH and sodium alkoxide NaOR.

10. Process according to Embodiment 9, wherein the mass ratio of NaOR to alcohol ROH in $L_2$ <113> is in the range from 1:100 to 1:5.

11. Process according to Embodiment 9 or 10, wherein the concentration of NaOR in $L_1$ <115> is 1.01 to 2.2 times higher than in $L_2$ <113>.

12. Process according to any of Embodiments 1 to 11, wherein the concentration of NaCl in $L_3$ <114> is in the range from 3.5 to 5 mol/l.

13. Process according to any of Embodiments 1 to 12, wherein the proportion by mass of the salt S in the solution $L_3$ is in the range from 0.1 ppm to 10% by weight.

14. Process according to any of Embodiments 1 to 13, which is performed at a temperature of 20 to 70° C. and a pressure of 0.5 to 1.5 bar.

DETAILED DESCRIPTION OF THE INVENTION

Figures

Figure 1:
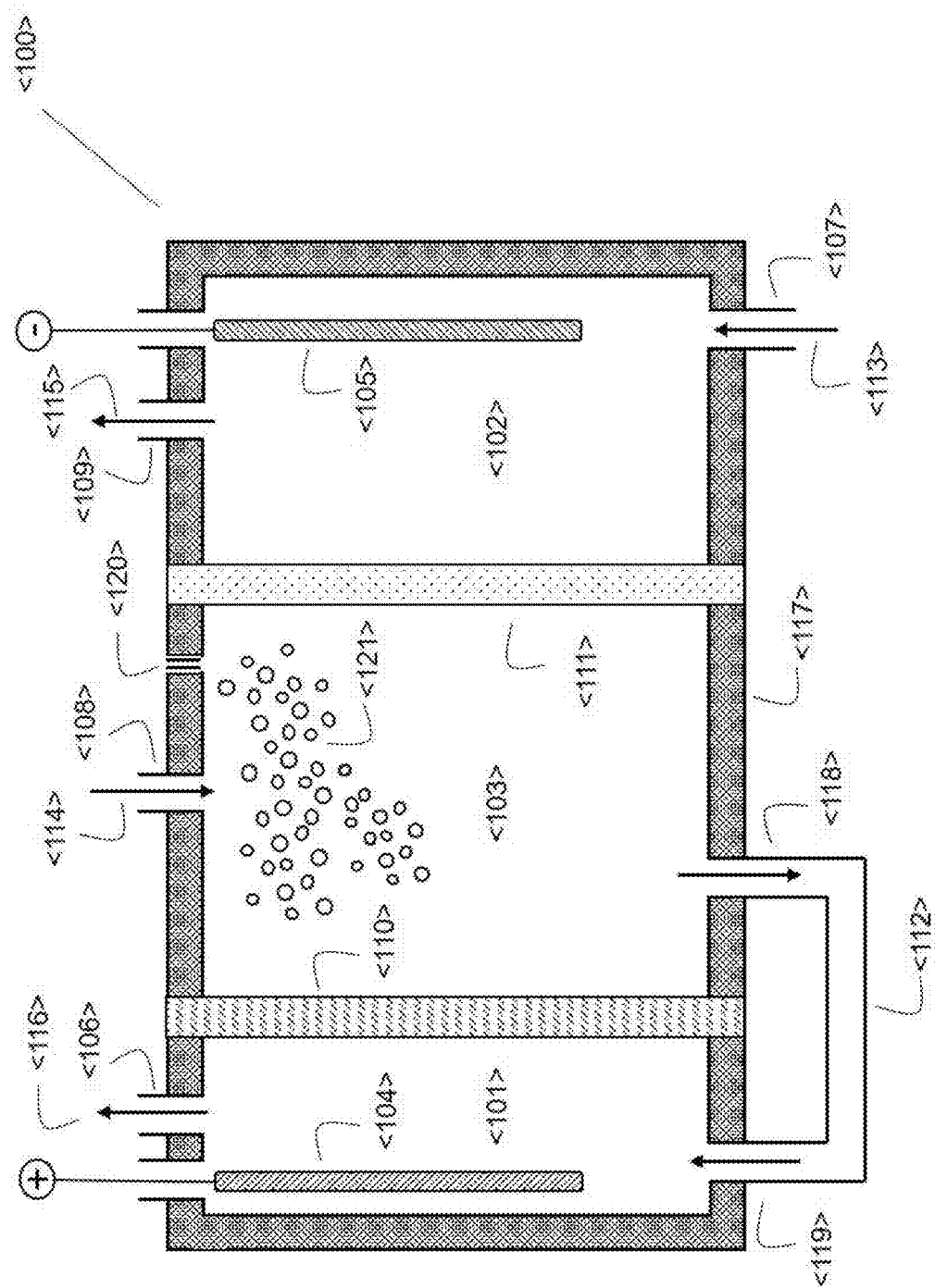
FIG. 1 shows the process according to the invention in a three-chamber cell E <100> comprising a cathode chamber $K_K$ <102>, an anode chamber $K_A$ <101> and an interposed middle chamber $K_M$ <103>.

FIG. 1 shows the process according to the invention in a three-chamber cell E <100> comprising a cathode chamber $K_K$ <102>, an anode chamber $K_A$ <101> and an interposed middle chamber $K_M$ <103>. The three chambers are bounded by an outer wall <117> of the three-chamber cell E <100>. The cathode chamber $K_K$ <102> is also separated from the middle chamber $K_M$ <103> by an NaSICON solid-state electrolyte $F_K$ <111> which is selectively permeable to sodium ions. The middle chamber $K_M$ <103> is additionally separated in turn from the anode chamber $K_A$ <101> by a diffusion barrier D <110>. The NaSICON solid-state electrolyte $F_K$ <111> and the diffusion barrier D <110> extend over the entire depth and height of the three-chamber cell E <100>.

A solution of sodium methoxide in methanol $L_2$ <113> is routed through the cathode chamber $K_K$ <102>. An aqueous solution of sodium chloride $L_3$ <114> with pH 10.5 comprising sodium carbonate is introduced through the inlet $Z_{KM}$ <108>, in the direction of gravity, into the middle chamber $K_M$ <103>. The connection $V_{AM}$ <112> formed between an outlet $A_{KM}$ <118> of the middle chamber $K_M$ <103> and an inlet $Z_{KA}$ <119> of the anode chamber $K_A$ <101> connects the middle chamber $K_M$ <103> to the anode chamber $K_A$ <101>. Sodium chloride and sodium carbonate solution $L_3$ <114> is routed through this connection $V_{AM}$ <112> from the middle chamber $K_M$ <103> into the anode chamber $K_A$ <101>. On application of a voltage, methanol is reduced to methoxide and $H_2$ in the cathode chamber $K_K$ <102>. At the same time, sodium ions diffuse from the middle chamber $K_M$ <103> through the NaSICON solid-state electrolyte $F_K$ <111> into the cathode chamber $K_K$ <102>. Overall, this increases the concentration of sodium methoxide in the cathode chamber $K_K$ <102>, which affords a methanolic solution of sodium methoxide $L_1$ <115>, the sodium methoxide concentration of which is elevated compared to $L_2$ <113>. In the anode chamber $K_A$ <101>, chloride ions from $L_3$ <114> are oxidized to $Cl_2$.

$Cl_2$ gives an acidic reaction in aqueous solution. Owing to the geometry of the three-chamber cell E <100> and the guiding of the aqueous solution $L_3$ <114>, the acid-sensitive NaSICON solid-state electrolyte <111> is protected from the elevated acidity, compared to $L_3$ <114>, of the solution $L_4$ <116> that results in the anode chamber $K_A$ <101>. At the same time, gaseous $CO_2$ <121> forms in the middle chamber $K_M$ <103>, a process that increases as electrolysis progresses. This $CO_2$ <121> can escape via the gas outlet <120> mounted on the middle chamber $K_M$ <103>. This avoids a gas bubble of $CO_2$ <121> in the middle chamber $K_M$ <103>.

Figure 2:
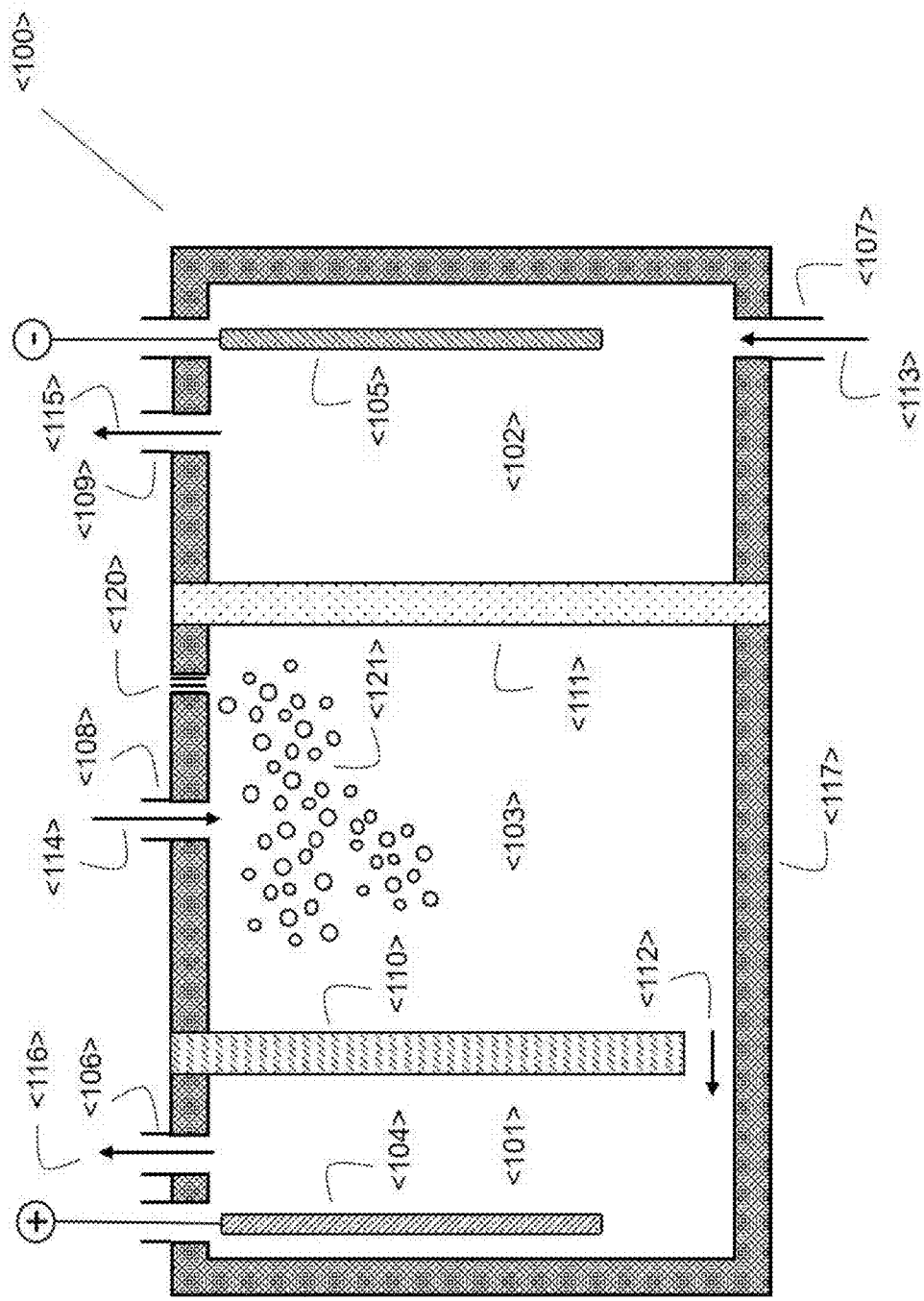
FIG. 2 shows an embodiment of the process according to the invention corresponding to that shown in FIG. 1.

FIG. 2 shows an embodiment of the process according to the invention corresponding to that shown in FIG. 1. The sole difference here is that the connection $V_{AM}$ <112> from the middle chamber $K_M$ <103> to the anode chamber $K_A$ <101> is formed by a perforation in the diffusion barrier D <110>.

Figure 3:
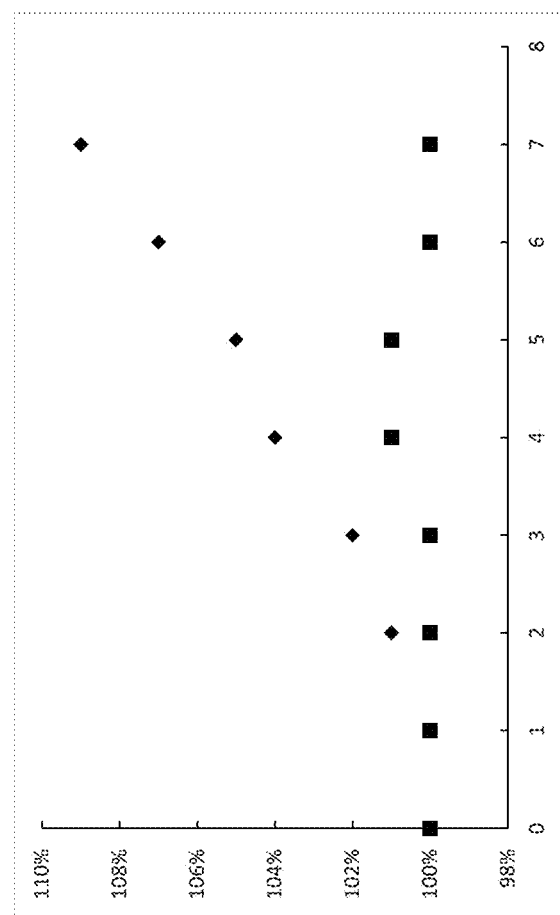
FIG. 3 shows a diagram of the progression of voltage in the electrolysis in a three-chamber cell with and without ventilation of the middle chamber.

FIG. 3 shows a diagram of the progression of voltage in the electrolysis in a three-chamber cell with and without ventilation of the middle chamber. The measurement points of the example conducted without ventilation in the three-chamber cell are represented by the symbol (♦), and those of the example conducted with ventilation in the three-chamber cell by the symbol (■). The x axis shows the time in hours, while the y axis shows the percentage change in the initial voltage measured in volts. The comparison shows that the cell according to the invention gives a constant voltage progression, whereas the voltage rises rapidly in the case of the three-chamber cell without ventilation owing to the formation of a $CO_2$ gas bubble.

Electrolysis Cell E

The process according to the invention is performed in an electrolysis cell E comprising at least one anode chamber $K_A$, at least one cathode chamber $K_K$ and at least one interposed middle chamber $K_M$. This also includes electrolysis cells E having more than one anode chamber $K_A$ and/or cathode chamber $K_K$ and/or middle chamber $K_M$. Such electrolysis cells in which these chambers are joined to one another in the form of modules are described, for example, in DD 258 143 A3, US 2006/0226022 A1.

The anode chamber $K_A$ comprises an anodic electrode $E_A$. A useful anodic electrode $E_A$ of this kind is any electrode familiar to the person skilled in the art that is stable under the conditions of the process according to the invention. These are described, in particular, in WO 2014/008410 A1, paragraph [024] or DE 10360758 A1, paragraph [031]. This electrode $E_A$ may consist of one layer or consist of multiple planar layers parallel to one another that may each be perforated or expanded. The anodic electrode $E_A$ especially comprises a material selected from the group consisting of ruthenium oxide, iridium oxide, nickel, cobalt, nickel tungstate, nickel titanate, precious metals such as, in particular, platinum, supported on a support such as titanium or Kovar k (an iron/nickel/cobalt alloy in which the individual components are preferably as follows: 54% by mass of iron, 29% by mass of nickel, 17% by mass of cobalt). Further possible anode materials are especially stainless steel, lead, graphite, tungsten carbide, titanium diboride. Preferably, $E_A$ comprises a titanium anode coated with ruthenium oxide/iridium oxide ($RuO_2+IrO_2/Ti$).

The cathode chamber $K_K$ comprises a cathodic electrode $E_K$. A useful cathodic electrode $E_K$ of this kind is any electrode familiar to the person skilled in the art that is stable under the conditions. These are described, in particular, in WO 2014/008410 A1, paragraph [025] or DE 10360758 A1, paragraph [030]. This electrode $E_K$ may be selected from the group consisting of mesh wool, three-dimensional matrix structure and "balls". The cathodic electrode $E_K$ especially comprises a material selected from the group consisting of steel, nickel, copper, platinum, platinized metals, palladium, carbon-supported palladium, titanium. Preferably, $E_K$ comprises nickel.

The at least one middle chamber $K_M$ is between the anode chamber $K_A$ and the cathode chamber $K_K$.

The electrolysis cell E typically has an outer wall $W_A$. The outer wall $W_A$ is especially selected from a material selected from the group consisting of steel, preferably rubberized steel, plastic, especially from Telene® (thermoset polydicyclopentadiene), PVC (polyvinylchloride), PVC-C (post-chlorinated polyvinylchloride), PVDF (polyvinylidenefluoride). $W_A$ may especially be permeated for inlets and outlets and for the gas outlet <120>. Within $W_A$ are then the at least one anode chamber $K_A$, the at least one cathode chamber $K_K$ and the at least one interposed middle chamber $K_M$.

$K_M$ is separated from $K_A$ by a diffusion barrier D and from $K_K$ by a sodium cation-conducting solid-state electrolyte $F_K$.

The diffusion barrier D used may be any material that is stable under the conditions of the process according to the invention and prevents or slows the transfer of protons from the liquid present in the anode chamber $K_A$ into the middle chamber $K_M$.

The diffusion barrier D used is especially a non-ion-specific dividing wall or a membrane permeable to specific ions. The diffusion barrier D is preferably a membrane permeable to specific ions.

The material for the non-ionic dividing wall is especially selected from the group consisting of fabric, which is especially textile fabric or metal weave, glass, which is especially sintered glass or glass frits, ceramic, especially ceramic frits, membrane diaphragms.

If the diffusion barrier D is a "membrane permeable to specific ions", what this means in accordance with the invention is that the respective membrane promotes the diffusion of particular ions therethrough over others. More particularly, what this means is membranes that promote the diffusion therethrough of ions of a particular charge type over ions of the opposite charge. Even more preferably, membranes permeable to specific ions also promote the diffusion of particular ions of one charge type over other ions of the same charge type therethrough.

Preferably, the diffusion barrier D is accordingly an anion-conducting membrane or a cation-conducting membrane. More preferably, the diffusion barrier D is a cation-conducting membrane.

According to the invention, anion-conducting membranes are those that selectively conduct anions, preferably selectively conduct particular anions. In other words, they promote the diffusion of anions therethrough over that of cations, especially over protons: even more preferably, they additionally promote the diffusion of particular anions therethrough over the diffusion of other anions therethrough.

According to the invention, cation-conducting membranes are those that selectively conduct cations, preferably selectively conduct particular cations. In other words, they promote the diffusion of cations therethrough over that of anions; even more preferably, they promote the diffusion of particular cations therethrough over the diffusion of other cations therethrough, more preferably still that of cations that are not protons, more preferably sodium cations, over protons.

What is meant more particularly by "promote the diffusion of particular ions X over the diffusion of other ions Y" is that the coefficient of diffusion (unit: $m^2/s$) of ion type X at a given temperature for the membrane in question is higher by a factor of 10, preferably 100, preferably 1000, than the coefficient of diffusion of ion type Y for the membrane in question.

The anion-conducting membrane used is especially one selective for chloride. Such membranes are known to and can be used by the person skilled in the art.

Salt S is at least one selected from hydrogencarbonate and carbonate, more preferably at least one selected from sodium carbonate and sodium hydrogencarbonate.

The anion-conducting membrane used is preferably a chloride-selective membrane.

Anion-conducting membranes are described, for example, by M. A. Hickner, A. M. Herring, E. B. Coughlin. Journal of Polymer Science, Part B: Polymer Physics 2013, 51, 1727-1735 and C. G. Arges, V. Ramani, P. N. Pintauro, Electrochemical Society Interface 2010, 19, 31-35. WO 2007/048712 A2 and on page 181 of the textbook by Volkmar M. Schmidt, Elektrochemische Verfahrenstechnik: Grundlagen, Reaktionstechnik, Prozessoptimierung [Electrochemical Engineering: Fundamentals, Reaction Technology. Process Optimization], 1st edition (8 Oct. 2003).

Even more preferably, anion-conducting membranes used are accordingly organic polymers that are especially selected from polyethylene, polybenzimidazoles, polyether ketones, polystyrene, polypropylene and fluorinated membranes such as polyperfluoroethylene, preferably polystyrene, where these have covalently bonded functional groups selected from —$NH_3^+$, —$NRH_2^+$, —$NR_3^+$, =$NR^+$; —$PR_3^+$, where R is alkyl groups having preferably 1 to 20 carbon atoms, or other cationic groups. They preferably have covalently bonded functional groups selected from —$NH_3^+$, —$NRH_2^+$ and —$NR_3^+$, more preferably selected from —$NH_3^+$ and —$NR_3^+$, even more preferably —$NR_3^+$.

When the diffusion barrier D is a cation-conducting membrane, it is most preferably a sodium ion-conducting membrane.

Cation-conducting membranes are described, for example, on page 181 of the textbook by Volkmar M. Schmidt, Elektrochemische Verfahrenstechnik: Grundlagen, Reaktionstechnik. Prozessoptimierung, 1st edition (8 Oct. 2003).

Even more preferably, cation-conducting membranes used are accordingly organic polymers that are especially selected from polyethylene, polybenzimidazoles, polyether ketones, polystyrene, polypropylene and fluorinated membranes such as polyperfluoroethylene, preferably polystyrene and poly perfluoroethylene, where these bear covalently bonded functional groups selected from —$SO_3^-$, —$COO^-$, —$PO_3^{2-}$ and —$PO_2H^-$, preferably —$SO_3^-$ and —$COO^-$, more preferably —$SO_3$ (described in DE 10 2010 062 804 A1, U.S. Pat. No. 4,831,146).

This may be, for example, a sulfonated polyperfluoroethylene (Nafion® with CAS number: 31175-20-9). These are known to the person skilled in the art, for example from WO 2008/076327 A1, paragraph [058], US 2010/0044242 A1, paragraph 100421 or US 2016/0204459 A1, and are commercially available under the Nafion®, Aciplex® F. Flemion®, Neosepta®, Ultrex®, PC-SK® trade names, Neosepta® membranes are described, for example, by S. A. Mareev, D. Yu. Butylskii, N. D. Pismenskaya, C. Larchet, L. Dammak, V. V. Nikonenko, Journal of Membrane Science 2018, 563, 768-776.

If a cation-conducting membrane is used as diffusion barrier D, this may, for example, be a polymer functionalized with sulfonic acid groups, especially of the formula $P_{NAFION}$ below, where n and m may independently be a whole number from 1 to $10^6$, preferably a whole number from 10 to $10^5$, more preferably a whole number from $10^2$ to $10^4$.

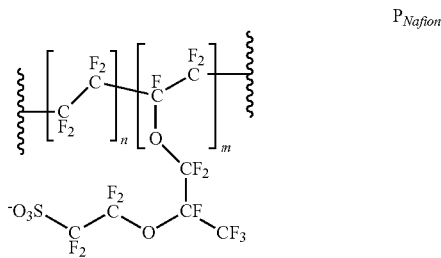

$P_{Nafion}$

A useful sodium cation-conducting solid-state electrolyte $F_K$ is any solid-state electrolyte that can transport sodium cations from the middle chamber $K_M$ into the cathode chamber $K_K$. Such solid-state electrolytes are known to the person skilled in the art and are described, for example, in DE 10 2015 013 155 A1, in WO 2012/048032 A2, paragraphs [0035], [0039], [0040], in US 2010/0044242 A1, paragraphs [0040], [0041], in DE 10360758 A1, paragraphs [014] to [025]. They are sold commercially under the NaSICON name. A sodium ion-conducting solid-state electrolyte $F_K$ more preferably has an NaSICON structure. NaSICON structures usable in accordance with the invention are also described, for example, by N. Anantharamulu, K. Koteswara Rao, G. Rambabu, B. Vijaya Kumar, Velchuri Radha, M. Vithal, J Mater. Sci 2011, 46, 2821-2837.

NaSICON preferably has a structure of the formula $M^I_{1+2w+x-y+z}M^{II}_w M^{III}_x Zr^{IV}_{2-w-x-y}M^V_y(SiO_4)_z(PO_4)_{3-z}$, $M^I$ is selected from $Na^+$, $Li^+$, preferably $Na^+$.

$M^{II}$ is a divalent metal cation, preferably selected from $Mg^{2+}$, $Ca^{2+}$, $Sr^{2+}$, $Ba^{2+}$, $Co^{2+}$, $Ni^{2+}$, more preferably selected from $Co^{2+}$, $Ni^{2+}$.

$M^{III}$ is a trivalent metal cation, preferably selected from $Al^{3+}$, $Ga^{3+}$, $Sc^{3+}$, $La^{3+}$, $Y^{3+}$, $Gd^{3+}$, $Sm^{3+}$, $Lu^{3+}$, $Fe^{3+}$, $Cr^{3+}$, more preferably selected from $Sc^{3+}$, $La^{3+}$, $Y^{3+}$, $Gd^{3+}$, $Sm^{3+}$, especially preferably selected from $Sc^{3+}$, $Y^{3+}$, $La^{3+}$.

$M^V$ is a pentavalent metal cation, preferably selected from $V^{5+}$, $Nb^{5+}$, $Ta^{5+}$.

The Roman indices I, II, III, IV, V indicate the oxidation numbers in which the respective metal cations exist.

w, x, y, z are real numbers, where 0≤x<2, 0≤y<2, 0≤w<2, 0≤z<3, and where w, x, y, z are chosen such that 1+2w+x−y+z≥0 and 2−w−x−y≥0.

Even more preferably in accordance with the invention, NaSICON has a structure of the formula $Na_{(1+4v)}Zr_2Si_vP_{(3-v)}O_{12}$ where v is a real number for which 0≤v≤3. Most preferably, v=2.4.

The cathode chamber $K_K$ also comprises an inlet $Z_{KK}$ and an outlet $A_{KK}$ that enables addition of liquid, for example the solution $L_2$, to the cathode chamber $K_K$ and removal of liquid present therein, for example the solution $L_1$. The inlet $Z_{KK}$ and the outlet $A_{KK}$ are mounted on the cathode chamber $K_K$ in such a way that the solution comes into contact with the cathodic electrode $E_K$ as it flows through the cathode chamber $K_K$. This is a prerequisite for the solution $L_1$ being obtained at the outlet $A_{KK}$ in the performance of the process according to the invention when the solution $L_2$ of an alkali metal alkoxide XOR in the alcohol ROH is routed through $K_K$.

The anode chamber $K_A$ also comprises an outlet $A_{KA}$ that enables removal of liquid present in the anode chamber $K_A$, for example the aqueous solution $L_4$. In addition, the middle chamber $K_M$ comprises an inlet $Z_{KM}$, while $K_A$ and $K_M$ are connected to one another by a connection $V_{AM}$. As a result, it is possible to add a solution $L_3$ to $K_M$ and then route it through $K_M$, and then to route it via $V_{AM}$ into the anode chamber $K_A$, then through this $K_A$. $V_{AM}$ and the outlet $A_{KA}$ are mounted on the anode chamber $K_A$ in such a way that the solution $L_3$ comes into contact with the anodic electrode $E_A$ as it flows through the anode chamber $K_A$. This is a prerequisite for the aqueous solution $L_4$ being obtained at the outlet $A_{KA}$ in the performance of the process according to the invention when the solution $L_3$ is routed first through $K_M$, then via $V_{AM}$, then through $K_A$.

Inlets $Z_{KK}$, $Z_{KM}$, $Z_{KA}$ and outlets $A_{KK}$, $A_{KA}$, $A_{KM}$ may be mounted on the electrolysis cell by methods known to the person skilled in the art.

According to the invention, the middle chamber $K_M$ has a gas outlet G <120>. A suitable gas outlet is any opening in the middle chamber $K_M$ through which gases formed in the middle chamber, especially $CO_2$, can escape into the atmosphere. The gas outlet is preferably mounted on the middle chamber $K_M$ in such a way that the $CO_2$ formed in the middle chamber $K_M$ can escape from the middle chamber $K_M$ counter to gravity. This preferably takes place via a gas exit, preferably a gas exit with condensate separator, a pressure valve or a hole with a connected vent conduit, more preferably through a hole with connected vent conduit.

The vent conduit is connected to the outlet $A_{KA}$ <106> (i.e. the chlorine draw or the brine outlet from the anolyte chamber), but may alternatively be operated with free discharge to the atmosphere. Utilizing the chlorine draw for the removal of the $CO_2$ has the advantage of a simplified construction of the electrolysis cell E. But the removal of the $CO_2$ independently of the chlorine draw leads to an improvement in the chlorine composition since $CO_2$ is not diluted with the chlorine. It is thus particularly preferable when the vent conduit is not connected to the outlet $A_{KA}$ <106> (i.e. the chlorine draw or the brine outlet from the anolyte chamber), i.e. is operated with free discharge to the atmosphere.

The connection $V_{AM}$ may be formed within the electrolysis cell E and/or outside the electrolysis cell E, If the connection $V_{AM}$ is formed within the electrolysis cell E, it is preferably formed by at least one perforation in the diffusion barrier D.

If the connection $V_{AM}$ is formed outside the electrolysis cell E, it is preferably formed by a connection of $K_M$ and $K_A$ that runs outside the electrolysis cell E, especially in that an outlet $A_{KM}$ is formed in the middle chamber $K_M$ through the outer wall $W_A$, preferably at the base of the middle chamber $K_M$, the inlet $Z_{KM}$ more preferably being at the top end of the middle chamber $K_M$, and an inlet $Z_{KA}$ is formed in the anode chamber $K_A$ through the outer wall $W_A$, preferably at the base of the anode chamber $K_A$, and these are preferably connected by a conduit, for example a pipe or a hose, preferably comprising a material selected from rubber and plastic. The outlet $A_{KA}$ is then more preferably at the top end of the anode chamber $K_A$.

"Outlet $A_{KM}$ at the base of the middle chamber $K_M$" means that the outlet $A_{KM}$ is mounted on the electrolysis cell E in such a way that the solution $L_3$ leaves the middle chamber $K_M$ in the direction of gravity.

"Inlet $Z_{KA}$ at the base of the anode chamber $K_A$" means that the inlet $Z_{KA}$ is mounted on the electrolysis cell E in such a way that the solution $L_3$ enters the anode chamber $K_A$ counter to gravity.

"Inlet $Z_{KM}$ at the top end of the middle chamber $K_M$" means that the inlet $Z_{KM}$ is mounted on the electrolysis cell E in such a way that the solution $L_3$ enters the middle chamber $K_M$ in the direction of gravity.

"Outlet $A_{KA}$ at the top end of the anode chamber $K_A$" means that the outlet $A_{KA}$ is mounted on the electrolysis cell E in such a way that the solution $L_4$ leaves the anode chamber $K_A$ counter to gravity.

This embodiment is particularly advantageous and therefore preferred when the outlet $A_{KM}$ is formed by the outer wall $W_A$ at the base of the middle chamber $K_M$, and the inlet $Z_{KA}$ by the outer wall $W_A$ at the base of the anode chamber $K_A$. This arrangement makes it possible in a particularly simple manner to separate gases formed in the middle chamber $K_M$ from $L_3$ via the gas outlet G, while gases formed in the anode chamber $K_A$ leave the anode chamber $K_A$ with $L_4$ and can then be separated off further.

Accordingly, the flow direction of $L_3$ into $K_M$ is the opposite of or the same as the flow direction of $L_3$ into $K_A$, preferably the opposite, according to how the connection $V_{AM}$ is mounted on the electrolysis cell E. Preferably, the flow direction of $L_3$ into $K_M$ is in the direction of gravity.

In a preferred embodiment of the present invention, connection $V_{AM}$ between middle chamber $K_M$ and anode chamber $K_A$ is arranged such that at least part of the aqueous solution $L_3$, preferably the entire aqueous solution $L_3$, flows completely through the middle chamber $K_M$ and the anode chamber K %.

When the connection $V_{AM}$ <112> is formed outside the electrolysis cell E <100>, this may especially be implemented in that $Z_{KM}$ <108> and $A_{KM}$ <118> are arranged at opposite ends of the outer wall $W_A$ <117> of the middle chamber $K_M$ <103> (i.e. $Z_{KM}$ <108> at the base and $A_{KM}$ <118> at the top end of the electrolysis cell E <100> or vice versa, preferably vice versa) and $Z_{KA}$ <119> and $A_{KA}$<106> are arranged at opposite ends of the outer wall $W_A$ <117> of the anode chamber $K_A$ <101> (i.e., as is preferred, $Z_{KA}$ <119> at the base and $A_{KA}$ <106> at the upper end of the electrolysis cell E <100> or vice versa), as shown more particularly in FIG. 1. By virtue of this geometry. $L_3$ <114> must flow through the two chambers $K_M$ <103> and $K_A$ <101>. It is possible here for $Z_K$ <119> and $Z_{KM}$ <108> to be formed on the same side of the electrolysis cell E <100>, in which case $A_{KM}$ <118> and $A_K$ <106> are automatically also formed on the same side of the electrolysis cell E <100>. Alternatively, as shown in FIG. 1, it is possible for $Z_{KA}$ <119> and $Z_{KM}$ <108> to be formed on opposite sides of the electrolysis cell E <100>, in which case $A_{KM}$ <118> and $A_{KA}$ <106> are automatically also formed on opposite sides of the electrolysis cell E <100>.

When the connection $V_{AM}$ <112> is formed within the electrolysis cell E <100>, this may especially be implemented in that one side ("side A") of the electrolysis cell E <100>, which is the top end or the base of the electrolysis cell E <100>, preferably the top end as shown in FIG. 2, comprises the inlet $Z_{KM}$ <108> and the outlet $A_{KA}$ <106>, and the diffusion barrier D <110> extends proceeding from this side A into the electrolysis cell <100>, but does not quite reach up to the side ("side B") of the electrolysis cell E <100> opposite side A, which is then the base or the top end of the electrolysis cell E <100>, and at the same time covers 50% or more of the height of the three-chamber cell E <100>, preferably 60% to 99% of the height of the three-chamber cell E <100>, more preferably 70% to 95% of the height of the three-chamber cell E <100>, even more preferably 80% to 90% of the height of the three-chamber cell E <100>, more preferably still 85% of the height of the three-chamber cell E <100>. Because the diffusion barrier D <110> does not touch side B of the three-chamber cell E <100>, a gap thus arises between diffusion barrier D <110> and the outer wall $W_A$ of side B of the three-chamber cell E <100>. In that case, the gap is the connection $V_{AM}$ <112>. By virtue of this geometry. $L_3$ must flow completely through the two chambers $K_M$ and $K_A$.

These embodiments best assure that the aqueous salt solution $L_3$ flows past the acid-sensitive solid-state electrolyte before it comes into contact with the anodic electrode $E_A$ <104>, which results in the formation of acids.

Furthermore, it is especially preferable in these embodiments when the gas outlet G is mounted at the top end of the middle chamber $K_M$, since this best assures that $CO_2$ only leaves the middle chamber, but a minimum amount of solution $L_3$.

According to the invention, "base of the electrolysis cell E" is the side of the electrolysis cell E through which a solution (e.g. $L_3$ <114> in the case of $A_{KM}$ <118> in FIG. 1) exits from the electrolysis cell E in the direction of gravity, or the side of the electrolysis cell E through which a solution (e.g. $L_2$ <113> in the case of $Z_{KK}$ <107> in FIGS. 1 and 2, and $L_3$ <114> in the case of $A_{KA}$ <119> in FIG. 1) is supplied to the electrolysis cell E counter to gravity.

According to the invention, "top end of the electrolysis cell E" is the side of the electrolysis cell E through which a solution (e.g. $L_4$ <116> in the case of $A_{KA}$ <106> and $L_1$ <115> in the case of $A_{KK}$ <109> in FIGS. 1 and 2) exits from the electrolysis cell E counter to gravity, or the side of the electrolysis cell E through which a solution (e.g. $L_3$ <114> in the case of $Z_{KM}$ <108> in FIGS. 1 and 2) is supplied to the electrolysis cell E in the direction of gravity.

Process Steps According to the Invention

The process according to the invention comprises steps (a), (b) and (c) as follows, which are performed simultaneously.

In step (a), a solution $L_2$ comprising the alcohol ROH, preferably comprising a sodium alkoxide NaOR in the alcohol ROH, is routed through $K_K$. R is an alkyl radical having 1 to 4 carbon atoms.

R is preferably selected from the group consisting of n-propyl, iso-propyl, ethyl and methyl, more preferably from the group consisting of ethyl and methyl. R is most preferably methyl.

Solution $L_2$ is preferably free of water. What is meant in accordance with the invention by "free of water" is that the weight of water in solution $L_2$ based on the weight of the alcohol ROH in solution $L_2$ (mass ratio) is ≤1:10, more preferably ≤1:20, even more preferably ≤1:100, even more preferably ≤0.5:100.

If solution $L_2$ comprises NaOR, the proportion by mass of NaOR in solution $L_2$, based on the overall solution $L_2$, is especially >0% to 30% by weight, preferably 5% to 20% by weight, more preferably 10% to 20% by weight, more preferably 10% to 15% by weight, most preferably 13% to 14% by weight, at the very most preferably 13% by weight.

If solution $L_2$ comprises NaOR, the mass ratio of NaOR to alcohol ROH in solution $L_2$ is especially in the range of 1:100 to 1:5, more preferably in the range of 1:25 to 3:20, even more preferably in the range of 1:12 to 1:8, even more preferably 1:10.

In step (b), a neutral or alkaline, aqueous solution $L_3$ comprising NaCl and at least one salt S selected from hydrogencarbonate and carbonate is routed through $K_M$ <103>, then via $V_{AM}$ <112>, then through $K_A$ <101>.

The salt S is especially selected from sodium hydrogencarbonate and sodium carbonate.

The pH of the aqueous solution $L_3$ is ≥7.0, preferably in the range of 7 to 12, more preferably in the range of 8 to 11, even more preferably 10 to 11, most preferably 10.5.

The proportion by mass of NaCl in solution $L_3$ is preferably in the range of >0% to 20% by weight, preferably 1% to 20% by weight, more preferably 5% to 20% by weight, even more preferably 10% to 20% by weight, most preferably 20% by weight, based on the overall solution $L_3$.

The proportion by mass of salt S in solution $L_3$ is preferably in the range of 0.1 ppm to 10% by weight, more preferably in the range of 1 ppm to 5% by weight, even more preferably 10 ppm to 1% by weight, even more preferably still 20 ppm to 400 ppm, especially preferably 20 to 100 ppm.

In step (c), it is then possible to apply a voltage between $E_A$ and $E_K$. This results in transfer of current from the charge source to the anode, transfer of charge via ions to the cathode and ultimately transfer of current back to the charge source. The charge source is known to the person skilled in the art and is typically a rectifier that converts alternating current to direct current and can generate particular voltages via voltage transformers.

This leads in turn to the following consequences:
solution $L_1$ <115> is obtained at the outlet $A_{KK}$ <109>, w % herein the concentration of NaOR in $L_1$ <115> is higher than in $L_2$ <113>,
an aqueous solution $L_4$ <116> of NaCl is obtained at the outlet $A_{KA}$ <106>, wherein the concentration of NaCl in $L_4$ <116> is lower than in $L_3$ <114>, and wherein the total concentration of all salts S in $L_4$ <116> is lower than in $L_3$ <114>,
$CO_2$ <121> forms in the middle chamber $K_M$ <103>, which is removed from the middle chamber $K_M$ <103> via the gas outlet G <120>.

In the process according to the invention, in particular, such a voltage is applied that such a current flows that the current density (=ratio of the current supplied to the electrolysis cell to the area of the solid-state electrolyte in contact with the anolyte present in the middle chamber $K_M$) is in the range from 10 to 8000 A/m², more preferably in the range from 100 to 2000 A/m², even more preferably in the range from 300 to 800 A/m², and most preferably is 363 A/m². This can be determined in a standard manner by the person skilled in the art. The area of the solid-state electrolyte in contact with the anolyte present in the middle chamber $K_M$ is especially 0.0001 to 10 m², preferably 0.001 to 2.5 m², more preferably 0.022 to 0.15 m², even more preferably 0.022 to 0.03 m².

It will be apparent that, in the process according to the invention, step (c) is performed when the two chambers $K_M$ and $K_A$ are at least partly laden with $L_3$ and $K_K$ is at least partly laden with $L_2$.

The fact that transfer of charge takes place between $E_A$ and $E_K$ in step (c) implies that $K_K$, $K_M$ and $K_A$ are simultaneously laden with $L_2$ and $L_3$ such that they cover the electrodes $E_A$ and $E_K$ to such an extent that the circuit is complete.

This is the case especially when a liquid stream of $L_3$ is routed continuously through $K_M$, $V_{AM}$ and $K_A$ and a liquid stream of $L_2$ through $K_K$, and the liquid stream of $L_3$ covers electrode $E_A$ and the liquid stream of $L_2$ covers electrode $E_K$ at least partly, preferably completely.

In a further preferred embodiment, the process according to the invention is performed continuously, i.e. step (a) and step (b) are performed continuously, while applying voltage as per step (c).

During the performance of step (c), lowering of the pH in the middle chamber $K_M$ in particular results in formation of $CO_2$, which is removed from the middle chamber $K_M$ <103> via the gas outlet G <120>, especially by free discharge to the atmosphere as described above.

After performance of step (c), solution $L_1$ is obtained at the outlet $A_{KK}$, wherein the concentration of NaOR in $L_1$ is higher than in $L_2$. If $L_2$ already comprised NaOR, the concentration of NaOR in $L_1$ is preferably 1.01 to 2.2 times, more preferably 1.04 to 1.8 times, even more preferably 1.077 to 1.4 times, even more preferably 1.077 to 1.08 times, higher than in $L_2$, most preferably 1.077 times higher than in $L_2$, where the proportion by mass of XOR in $L_1$ and in $L_2$ is more preferably in the range from 10% to 20% by weight, even more preferably 13% to 14% by weight.

At the outlet $A_{KA}$, an aqueous solution $L_4$ of NaCl and possibly also S is obtained, where the total concentration of NaCl in $L_4$ is lower than that of NaCl in $L_3$.

The total concentration of all salts S in $L_4$ is lower than the total concentration of all salts S in $L_3$; more particularly, the proportion by mass of all salts S in L is 5% to 95% lower, preferably 10% to 90% lower, more preferably 20% to 80% lower, even more preferably 30% to 70% lower, even more preferably still 40% to 60% lower, yet more preferably still 50% lower, than the proportion by mass of all salts S in $L_3$.

The concentration of sodium chloride in the aqueous solution $L_3$ is preferably in the range of 3.5 to 5 mol/l, more preferably 4 mol/l. The concentration of sodium chloride in the aqueous solution L is more preferably 0.5 mol/l lower than that of the aqueous solution $L_3$ used in each case.

In particular, $Cl_2$ is also obtained at the outlet $A_{KA}$. This disproportionates according to the above equation (4) and preferably outgases in the anode chamber $K_A$. It is typically removed from the electrolysis cell E with the aqueous solution 14 at the outlet $A_{KA}$.

In particular, the process according to the invention is performed at a temperature of 20° C. to 70° C., preferably 35° C. to 65° C., more preferably 50° C. to 65° C., and a pressure of 0.5 bar to 1.5 bar, preferably 0.9 to 1.1 bar, more preferably 1.0 bar.

In the course of performance of the process according to the invention, hydrogen is typically formed in the cathode chamber $K_K$, which can be removed from the cell together with solution $L_1$ via outlet $A_{KK}$. The mixture of hydrogen and solution $L_1$ can then, in a particular embodiment of the present invention, be separated by methods known to the person skilled in the art. In particular, chlorine or another halogen gas forms in the anode chamber $K_A$, which can be removed from the cell together with solution $L_4$ via outlet $A_{KA}$. Additionally formed in the anode chamber $K_A$ is especially also carbon dioxide, which can likewise be removed. Chlorine and/or $CO_2$ may then, in a particular embodiment of the present invention, be separated from solution $L_4$ by methods known to the person skilled in the art. It is then likewise possible, after the gases have been separated off, to separate the mixture of chlorine and $CO_2$ from solution $L_4$ by methods known to the person skilled in the art.

It is preferable also to mount a further gas outlet $G_2$ in the anode chamber $K_A$, with the aid of which $CO_2$ can be removed, optionally in a mixture with chlorine, directly after formation in the anode chamber $K_A$. The gas outlet $G_2$ is preferably mounted on the anode chamber $K_A$ in such a way that the $CO_2$ formed in the anode chamber $K_A$ can escape from the anode chamber $K_A$ counter to gravity, optionally together with the $Cl_2$ formed during the electrolysis and/or any $O_2$ formed.

These results were surprising and unexpected in the light of the prior art. The process according to the invention protects the acid-labile solid-state electrolyte from corrosion without, as in the prior art, having to sacrifice alkoxide solution from the cathode space as buffer solution. Thus, the process according to the invention is more efficient than the procedure described in WO 2008/076327 A1, in which the product solution is used for the middle chamber, which reduces the overall conversion.

In addition, the formation of a gas bubble of $CO_2$ in the middle chamber $K_M$ is reduced, and hence a more energy-efficient process is enabled.

PREFERRED EMBODIMENTS OF THE INVENTION

FIG. 1 shows a preferred embodiment of the invention in a three-chamber cell E <100>. This comprises a cathode chamber $K_K$ <102>, a middle chamber $K_M$ <103> and an anode chamber $K_A$ <101>. The anode chamber $K_A$ <101> and the middle chamber $K_M$ <103> are separated from one another by an anion exchange membrane as diffusion barrier D <110> that extends over the entire cross section of the three-chamber cell E <100>. The cathode chamber $K_K$ <102> and the middle chamber $K_M$ <103> are separated from one another by a permeable solid-state electrolyte (NaSICON) <111> selective for sodium ions, which extends over the entire cross section of the three-chamber cell E <100>. The cathode chamber $K_K$ <102> comprises a cathodic electrode $E_K$ <105>, an inlet $Z_{KK}$ <107> and an outlet $A_{KK}$ <109>.

The anode chamber $K_A$ <101> comprises an anodic electrode $E_A$ <104> and an outlet $A_{KA}$ <106> and is connected to the middle chamber $K_M$ <103> via the connection $V_{AM}$ <112>. The middle chamber $K_M$ <103> additionally comprises an inlet $Z_{KM}$ <108> and a gas outlet G <120>. In the embodiment according to FIG. 1, the connection $V_{AM}$ <112> is formed outside the electrolysis cell E <100>, especially by a pipe or hose, the material of which may be selected from rubber and plastic, with which liquid can be routed from the middle chamber $K_M$ <103> into the anode chamber $K_A$ <101> outside the outer wall $W_A$ <117> of the three-chamber cell E <100>. The connection $V_{AM}$ <112> connects an outlet $A_{KM}$ <118> that penetrates the outer wall $W_A$ <117> of the electrolysis cell E <100> at the base of the middle chamber $K_M$ <103> to an inlet $Z_{KA}$ <119> that penetrates the outer wall $W_A$ <117> of the electrolysis cell E <100> at the base of the anode chamber $K_A$ <101>.

An electrolyte $L_2$ <113> is routed into the cathode chamber $K_K$ <102> via the inlet $Z_{KK}$ <107>. The electrolyte $L_2$ <113> comprises methanol; the electrolyte $L_2$ <113> used is preferably a methanolic solution of sodium methoxide $L_2$ <113>.

At the same time, an aqueous NaCl solution $L_3$ <114> with pH 10.5 and a total proportion by mass of sodium hydrogencarbonate and sodium carbonate totaling 20 to 100 ppm is introduced into the middle chamber $K_M$ <103> via the inlet $Z_{KM}$ <108>. This flows through the middle chamber $K_M$ <103> and the connection $V_{AM}$ <112> into the anode chamber $K_A$ <101>.

At the same time, a voltage is applied between the cathodic electrode $E_K$ <105> and the anodic electrode $E_A$<104>. This results in reduction of methanol in the electrolyte $L_2$ <113> to give methoxide and $H_2$ in the cathode chamber $K_K$ <102> ($CH_3OH + e^- \rightarrow CH_3O^- + \frac{1}{2}H_2$). In the anode chamber $K_A$ <101>, the oxidation of chloride ions takes place to give molecular chlorine ($Cl^- \rightarrow \frac{1}{2}Cl_2 + e^-$). Chlorine gas ($Cl_2$) in water, according to the reaction $Cl_2 + H_2O \rightarrow HOCl + HCl$, forms hypochlorous acid and hydrochloric acid, which give an acidic reaction with further water molecules. The acidity would damage the NaSICON solid-state electrolyte <111>, but is restricted to the anode chamber $K_A$ <101> by the arrangement according to the invention, and hence kept away from the NaSICON solid-state electrolyte $F_K$ <111> in the electrolysis cell E <100>. This considerably increases the lifetime thereof. This acidity is nevertheless sufficient to protonate $HCO_3^-$ and $CO_3^{2-}$ to give carbonic acid, which then, according to the equilibrium (5)

$$H_2CO_3 \leftrightarrow CO_2 + H_2O \tag{5}$$

outgases carbon dioxide <121>. This can escape from the middle chamber $K_M$ <103> through the gas outlet G <121>.

At the same time, sodium ions diffuse from the middle chamber $K_M$ <103> through the NaSICON solid-state electrolyte <111> into the cathode chamber $K_K$ <102>. Overall, this increases the concentration of sodium methoxide in the cathode chamber $K_K$ <102>, which affords a methanolic solution of sodium methoxide $L_1$ <115>, the sodium methoxide concentration of which is elevated compared to $L_2$ <113>. Owing to the geometry of the three-chamber cell E <100> and the guiding of the aqueous solution $L_3$ <114> according to the invention, the acid-sensitive NaSICON solid-state electrolyte <111> is protected from the elevated acidity, compared to $L_3$ <114>, of the solution $L_4$ <116> that results in the anode chamber $K_A$ <101>.

At the same time, chlorine gas forms at the anode $E_A$<104> in the anode chamber $K_A$ <101>, which is removed via the outlet $A_{KA}$ <106> together with solution $L_4$ <116>.

The embodiment of the present invention shown in FIG. 2 corresponds to that shown in FIG. 1. The only difference here is that the connection $V_{AM}$ <112> within the electrolysis cell E <100> takes such a form that the diffusion barrier D <110> does not extend over the entire cross section of the three-chamber cell E <100>. The connection $V_{AM}$ <112> from the middle chamber $K_M$ <103> to the anode chamber $K_A$ <101> is thus formed by a gap in the diffusion barrier D <110>. In further preferred embodiments of the present invention, it is also possible to utilize diffusion barriers D <110> having more than one gap, such that the connection $V_{AM}$ <112> between middle chamber $K_M$ <103> and anode chamber $K_A$ <101> is formed by multiple gaps.

EXAMPLES

Comparative Example 1

Sodium methoxide (SM) was prepared via a cathodic process, wherein the anolyte supplied in the middle chamber is 20% by weight NaCl solution (in water) and that supplied in the cathode chamber is 10% by weight methanolic SM solution. The NaCl solution comprised 0.04% by weight of $Na_2CO_3$.

The electrolysis cell consisted of three chambers, as shown in FIG. 1, and the anolyte was transferred through the middle chamber into the anode chamber. The connection between middle chamber and anode chamber was established by a hose mounted at the base of the electrolysis cell. The anode chamber and middle chamber were separated by a 0.03 m$^2$ cation exchange membrane (Asai Kasai, F 6801, polytetrafluoroethylene, with sulfonate groups and carboxylate groups). Cathode chamber and middle chamber were separated by a ceramic of the NaSICON type with an area of 0.022 m$^2$. The ceramic has a chemical composition of the formula $Na_{3.4}Zr_{2.0}Si_{2.4}P_{0.6}O_{12}$. The flow rate of the anolyte was 1 l/h, that of the catholyte was 3.5 l/h, and a current of 8 A was applied. The temperature was 65° C. It was found that a gas bubble of $CO_2$ forms in the middle chamber over a prolonged period, which is attributable to the carbonates in the brine. This leads to a rise in the voltage.

The progression of voltage as the change in the initial voltage (in %) over time (in hours) is shown in FIG. 3 (♦).

Inventive Example

Comparative Example 1 was repeated, except that, as well as the inlet for the anolyte, a hole of diameter 2 mm was introduced into the middle chamber. A vent conduit was attached to this hole.

Comparative Example 1 was repeated with this electrolysis cell. The measured voltage over time corresponded to the voltage measured at the start of Comparative Example 1. In contrast with Example 1, the voltage does not rise over the duration of the experiment (see FIG. 3, ■).

In addition, gas bubbles are clearly apparent, which escape through the additional gas outlet. However, this prevents the formation of a $CO_2$ bubble in the middle chamber.

Result

The use of a three-chamber cell as in the process according to the invention prevents the corrosion of the solid-state electrolyte, and at the same time there is no need to sacrifice alkali metal alkoxide product for the middle chamber.

In addition, by virtue of the formation of a gas draw in the middle chamber, it is also possible to use brine that has been pretreated with carbonates or hydrogencarbonates and hence contains them at least to some degree in the electrolysis, without formation of a gas bubble in the middle chamber of the electrolysis cell. In addition, the content of $CO_2$ in the chlorine gas generated in the anode chamber is also distinctly reduced, which facilitates the subsequent separation of the $CO_2$ from chlorine.

The invention claimed is:

1. A process for preparing a solution Li of a sodium alkoxide NaOR in an alcohol ROI-1, in an electrolysis cell E, wherein E comprises at least one anode chamber $K_A$, at least one cathode chamber $K_K$, and at least one interposed middle chamber $K_M$, the process comprising:
   (a) routing a solution $L_2$ comprising the alcohol ROH through the at least one cathode chamber $K_K$,
   (b) routing a neutral or alkaline, aqueous solution $L_3$ comprising NaCl and at least one salt S selected from the group consisting of hydrogencarbonate and carbonate, through the at least one interposed middle chamber $K_M$, then via a connection $V_{AM}$, through the at least one anode chamber $K_A$, and
   (c) applying voltage between an anodic electrode $E_A$ and a cathodic electrode $E_K$, wherein (a), (b), and (c) are performed simultaneously,
   wherein the at least one anode chamber $K_A$ comprises the anodic electrode $E_A$ and an outlet $A_{KA}$,
   wherein the at least one cathode chamber $K_K$ comprises the cathodic electrode $E_K$, an inlet $Z_{KK}$ and an outlet $A_{KK}$,
   wherein the at least one interposed middle chamber $K_M$ comprises an inlet $Z_{KM}$ and a gas outlet G, wherein the at least one interposed middle chamber $K_M$ is separated from the at least one anode chamber $K_A$ by a diffusion barrier D and is separated from the at least one cathode chamber $K_K$ by a sodium cation-conducting solid-state electrolyte $F_K$,
   wherein the at least one anode chamber $K_A$ and the at least one interposed middle chamber $K_M$ are connected to one another by the connection $V_{AM}$ through which liquid can be routed from the at least one interposed middle chamber $K_M$ into the at least one anode chamber $K_A$,
   wherein the process affords the solution $L_1$ at the outlet $A_{KK}$, wherein the concentration of NaOR in the solution $L_1$ is higher than in the solution $L_2$,
   wherein the process affords an aqueous solution $L_4$ of NaCl at the outlet $A_{KA}$, wherein the concentration of NaCl in the solution $L_4$ is lower than in the solution $L_3$, and wherein the total concentration of all salts S in the solution $L_1$ is lower than in the solution $L_3$,
   wherein the process forms $CO_2$ in the at least one interposed middle chamber $K_M$, which is removed from the at least one interposed middle chamber $K_M$ via the gas outlet G, and
   wherein R is an alkyl radical having 1 to 4 carbon atoms.

2. The process according to claim 1, wherein R is selected from the group consisting of methyl and ethyl.

3. The process according to claim 1, wherein the diffusion barrier D is selected from the group consisting of cation-conducting membranes and anion-conducting membranes.

4. The process according to claim 3, wherein the diffusion barrier D is a sodium cation-conducting membrane.

5. The process according to claim 1, wherein a flow direction of the solution $L_3$ in the middle chamber $K_M$ is the opposite of the flow direction of the solution $L_3$ in the anode chamber $K_A$.

6. The process according to claim 1, wherein the connection $V_{AM}$ is formed within and/or outside the electrolysis cell E.

7. The process according to claim 1, wherein the connection $V_{AM}$ between middle chamber $K_M$ and anode chamber $K_A$ is arranged in such a way that at least a portion of the aqueous solution $L_3$ flows completely through the middle chamber $K_M$ and the anode chamber $K_A$.

8. The process according to claim 1, wherein the sodium cation-conducting solid-state electrolyte $F_K$ has a structure of the formula $$M^I_{1+2w+x-y+z}M^{II}_wM^{III}_xZr^{IV}_{2-w-x-y}M^V_y(SiO_4)_z(PO_4)_{3-z},$$

wherein $M^I$ is selected from $Na^+$ and $Li^+$, $M^{II}$ is a divalent metal cation, $M^{III}$ is a trivalent metal cation, $M^V$ is a pentavalent metal cation, and the Roman indices I, II, III, IV, V indicate the oxidation numbers in which the respective metal cations exist, and wherein w, x, y, and z are real numbers, wherein $0 \leq x < 2$, $0 \leq y < 2$, $0 \leq w < 2$, and $0 \leq z < 3$, and wherein w, x, y, and z are chosen such that $1+2w+x-y+z \geq 0$ and $2-w-x-y \geq 0$.

9. The process according to claim 1, wherein the solution $L_2$ comprises the alcohol ROH and the sodium alkoxide NaOR.

10. The process according to claim 9, wherein the mass ratio of the sodium alkoxide NaOR to the alcohol ROH in the solution $L_2$ is in the range from 1:100 to 1:5.

11. The process according to claim 9, wherein the concentration of NaOR in the solution $L_1$ is 1.01 to 2.2 times higher than in the solution $L_2$.

12. The process according to claim 1, wherein the concentration of NaCl in the solution $L_3$ is in the range from 3.5 to 5 mol/l.

13. The process according to claim 1, wherein a proportion by mass of the salt S in the solution $L_3$ is in the range from 0.1 ppm to 10% by weight.

14. The process according to claim 1, wherein the process is performed at a temperature of 20 to 70° C. and a pressure of 0.5 to 1.5 bar.

* * * * *

UNITED STATES PATENT AND TRADEMARK OFFICE
CERTIFICATE OF CORRECTION

PATENT NO. : 11,629,415 B2  
APPLICATION NO. : 17/207862  
DATED : April 18, 2023  
INVENTOR(S) : Michael Horn et al.

Page 1 of 1

It is certified that error appears in the above-identified patent and that said Letters Patent is hereby corrected as shown below:

In the Claims

Column 19, Line 65, in Claim 1 currently reads, "solution Li" and should read --solution $L_1$--;

Column 19, Line 66, in Claim 1 currently reads, "ROI-1" and should read --ROH--; and Column 20, Line 41, in Claim 1 currently reads, "solution $L_1$" and should read --solution $L_4$--.

Signed and Sealed this  
Fourth Day of July, 2023

Katherine Kelly Vidal  
*Director of the United States Patent and Trademark Office*